(12) United States Patent
Kozlow et al.

(10) Patent No.: US 8,684,312 B2
(45) Date of Patent: Apr. 1, 2014

(54) METHOD AND SYSTEM FOR CHECKING THE FORMATION OF ICE ON AN AIRCRAFT IN FLIGHT

(75) Inventors: Boris Kozlow, Toulouse (FR); Nicholas Dart, Bristol (GB)

(73) Assignees: AIRBUS Operations S.A.S., Toulouse (FR); AIRBUS Operations Limited, Bristol (GB)

( * ) Notice: Subject to any disclaimer, the term of this patent is extended or adjusted under 35 U.S.C. 154(b) by 232 days.

(21) Appl. No.: 13/082,893

(22) Filed: Apr. 8, 2011

(65) Prior Publication Data
US 2011/0253841 A1    Oct. 20, 2011

(30) Foreign Application Priority Data
Apr. 9, 2010 (FR) .................................. 10 52726

(51) Int. Cl.
*B64D 15/04* (2006.01)
*B64D 15/16* (2006.01)
*B64F 5/00* (2006.01)

(52) U.S. Cl.
USPC .................................. 244/134 R; 244/134 D

(58) Field of Classification Search
USPC ..... 244/134 F, 134 R, 134 D; 702/24; 701/14
See application file for complete search history.

(56) References Cited

U.S. PATENT DOCUMENTS

| 5,686,841 | A | 11/1997 | Stolarczyk et al. | |
|---|---|---|---|---|
| 2004/0024538 | A1 | 2/2004 | Severson et al. | |
| 2007/0176049 | A1 | 8/2007 | Greene | |
| 2007/0240435 | A1 | 10/2007 | Elpern et al. | |
| 2007/0267546 | A1 * | 11/2007 | Shah et al. | 244/134 F |
| 2008/0167764 | A1 | 7/2008 | Flemming | |
| 2009/0294593 | A1 * | 12/2009 | Jacquet-Francillon et al. | 244/134 R |
| 2009/0321576 | A1 * | 12/2009 | Shah et al. | 244/134 F |
| 2010/0123044 | A1 * | 5/2010 | Botura | 244/134 D |

FOREIGN PATENT DOCUMENTS

FR        2 875 542        3/2006
WO    WO 2005/006271 A2    1/2005

OTHER PUBLICATIONS

French Preliminary Search Report issued Nov. 18, 2010, in French 1052726, filed Apr. 9, 2010 (with English Translation of Category of Cited Documents).

* cited by examiner

*Primary Examiner* — Philip J Bonzell
(74) *Attorney, Agent, or Firm* — Oblon, Spivak, McClelland, Maier & Neustadt, L.L.P.

(57) ABSTRACT

The invention relates to a method for checking the formation of ice on an aircraft in flight, characterized in that the method comprises:
  the estimation (S4) in real time of a quantity of ice (SWC) forming on at least one zone of the aircraft according to flight conditions and
  the comparison (S5) between the estimated quantity of ice (SWC) and a predetermined quantity of ice ($SWC_{max}$; $SWC_{THR}$).

17 Claims, 2 Drawing Sheets

METHOD AND SYSTEM FOR CHECKING THE FORMATION OF ICE ON AN AIRCRAFT IN FLIGHT

The invention relates to a method and a system for checking the formation of ice on an aircraft in flight.

It is known that aircraft are certified for flying under freezing conditions, such conditions generally arising at altitudes below 20,000 feet (approximately 6000 meters).

When an aircraft flies in zones where freezing conditions are likely to occur, ice may form on the exterior surfaces of the aircraft and change the aerodynamic characteristics of the latter.

The flying of the aircraft then must be adjusted according to the changed aerodynamism of the aircraft.

At the time of certification of an aircraft, particularly at the time of flights in freezing conditions, it is provided to determine the safety operational limits as regards the performance envelope and the outside conditions and also the aerodynamic changes of the aircraft following the formation of ice.

It will be noted that icing is manifested by a deposit or an accumulation of ice on the parts of the airplane exposed to the relative wind and on those having angular parts such as the leading edges of wing areas.

In order to make sure that the aircraft remains within the operational limits defined at the time of the certification process or in order to maintain an appropriate safety level with respect to the formation of ice, the aircraft generally is equipped with deicing devices which make it possible to prevent as much as possible the formation of ice/frost on the wing areas.

The applicant realized that it would be worthwhile to be able to check or monitor the formation of ice on an aircraft in real or quasi-real time.

In this respect, this invention has as an object a method for checking the formation of ice on an aircraft in flight, characterized in that the method comprises:
  estimation in real time of a quantity of ice (SWC) forming on at least one zone of the aircraft according to flight conditions and
  comparison between the estimated quantity of ice (SWC) and a predetermined quantity of ice ($SWC_{max}$; $SWC_{THR}$).

Practically speaking, the quantity of ice is a quantity of ice per unit of surface.

The estimation in real or quasi-real time of a quantity of ice formed on the aircraft during flight and the comparison of this estimation with a threshold value makes it possible to check/follow the progressive phenomenon of icing and to act appropriately in case the threshold is reached or exceeded.

It should be noted that the aforementioned threshold (predetermined quantity of ice) is selected, for example, to be below a maximal quantity of ice determined at the time of the certification process for the aircraft which has been obtained beforehand at the time of flight testing of the aircraft.

The selected threshold which is below this maximal value provides the crew with a margin of safety making it possible, when it is reached, to apply operational procedures before the maximum value is reached.

In this way, different decisions may be made according to the result of the comparison between the estimation of the quantity of ice formed on the aircraft and the chosen threshold value.

It thus is possible, for example, to decide, according to the result of the comparison, to activate a deicing device carried on board the aircraft and/or to activate an on-board alarm system, for example in the cockpit.

The activation of an alarm system includes, for example, the transmission of a visual alarm message, for example displayed on a screen in the cockpit, and/or the transmission of an auditory alarm message.

According to one characteristic, the real-time estimation of the quantity of ice (SWC) depends on the distance traveled by the aircraft and on a quantity of liquid water (at negative temperatures, this is what is called supercooled water) which is likely to turn into ice on the aircraft during flight under freezing conditions (for an altitude below 20,000 feet).

According to one characteristic, the real-time estimation of the quantity of ice comprises:
  obtaining the speed of the aircraft,
  obtaining a value for a quantity of liquid water which is likely to turn into ice on the aircraft.

Obtaining the speed of the aircraft generally is accomplished by one or more measurements of the speed of the aircraft by virtue of sensors present on board the latter.

According to one characteristic, obtaining a value for a quantity of liquid water which is likely to turn into ice on the aircraft comprises the measurement of the quantity of liquid water encountered by the aircraft during flight.

According to this embodiment, a quantity of liquid water is measured by one or more sensors present on board the aircraft during flight and this measurement or these measurements is/are integrated according to the distance traveled by the aircraft.

It will be noted that the real-time estimation of the quantity of ice forming on at least one zone of the aircraft depends on the time between two consecutive measurements of the speed of the aircraft and the quantity of liquid water encountered by the aircraft during flight.

According to another embodiment, the value for a quantity of liquid water obtained for real-time estimation of the quantity of ice is a value which has been determined beforehand, for example during flight testing for certification of the aircraft in freezing conditions.

This value is constant during flight.

According to a variant, however, several icing thresholds (characterized by different ice quantity (SWC) values) may be used.

Such thresholds correspond, for example, to several distinct flight phases.

According to another variant, several thresholds corresponding to several alarm levels are used. They may be, for example, three in number and correspond respectively to an onset of freezing conditions, moderate icing conditions and severe icing conditions.

According to another variant, an average rate of ice accretion or speed of ice formation is determined from the estimated quantity of ice.

In this case, this determined value of the accretion rate is compared with one or more thresholds corresponding to predetermined levels of the rate of ice accretion. They are, for example, three in number.

Advantageously, the information items corresponding to the estimated quantity of ice, to the average rate of ice accretion, and their comparison to their respective thresholds are communicated to the pilot.

This enables him in particular to judge the severity of the icing and to adjust his path, his altitude, etc. accordingly.

In this respect, the real-time estimation of the quantity of ice forming on at least one zone of the aircraft depends on this value and on the time between two consecutive measurements of the speed of the aircraft.

According to another characteristic, the method comprises the estimation of the time remaining for the aircraft to fly under freezing conditions before reaching the predetermined quantity of ice.

The information item on the value of this remaining time is useful to the crew since it enables the latter to know how much time is available for implementing the various procedures in order to avoid reaching the maximum value for the quantity of ice determined during certification flight testing.

The invention also has as an object a system for checking the formation of ice on an aircraft in flight, characterized in that the system comprises:

means for real-time estimation of a quantity of ice (SWC) forming on at least one zone of the aircraft according to flight conditions and means for comparison between the estimated quantity of ice (SWC) and a predetermined quantity of ice (SWC$_{max}$; SWC$_{THR}$).

Such an on-board system comprises means making it possible to implement the checking method briefly set forth above.

The system thus also may comprise means for obtaining the speed of the aircraft and means for obtaining a quantity of liquid water which is likely to turn into ice on the aircraft.

According to one embodiment, the means for obtaining a value for a quantity of liquid water are more particularly means for measuring the quantity of water encountered by the aircraft during its flight.

According to another embodiment, the means for obtaining a value for a quantity of liquid water extract the value for a quantity of liquid water from a memory or storage space and supply this value to the estimation means with a view to undertaking estimation of the quantity of ice.

The system also comprises means for estimation of the time remaining for the aircraft to fly under freezing conditions before reaching the predetermine quantity of ice, that is to say before this predetermined quantity of ice forms on the surface of the aircraft.

Furthermore, the checking system according to the invention also may be connected to an on-board deicing device and/or to an alarm system which comprises means for transmission of a visual and/or auditory alarm message.

The invention additionally has as an object an aircraft comprising a system for in-flight checking of the formation of ice on the said aircraft.

Other characteristics and advantages will become apparent during the description that is going to follow, provided solely by way of non-limitative example and presented with reference to the attached drawings, on which:

Figure 1:
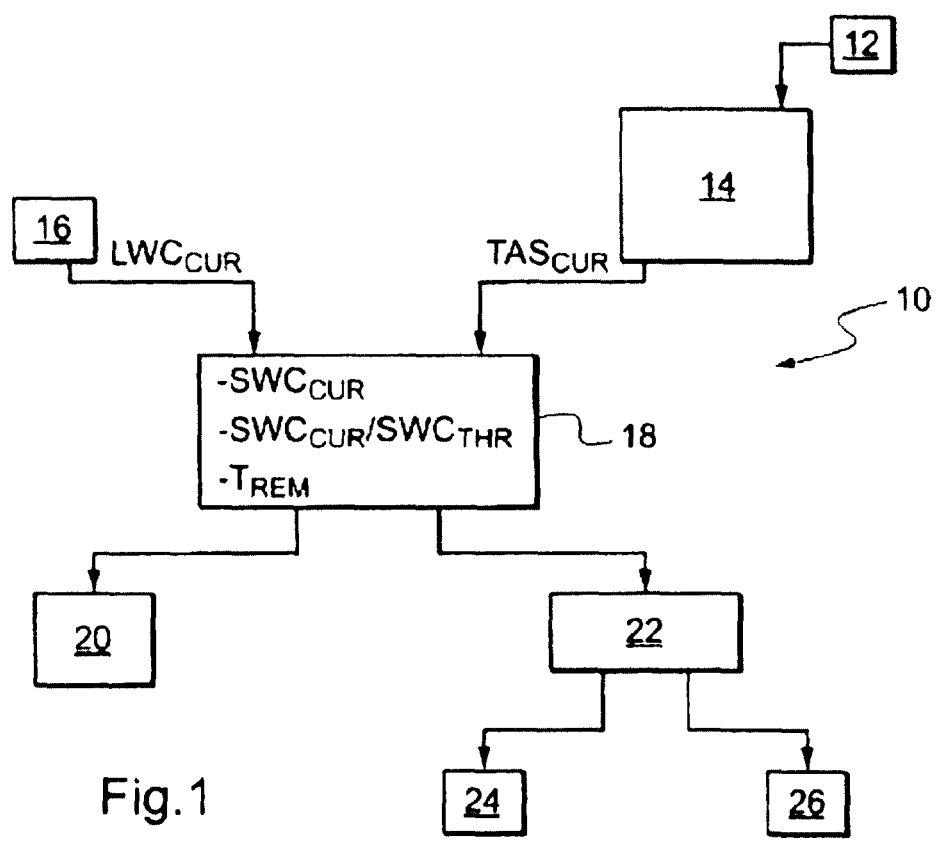
FIG. 1 is a general schematic view of an on-board system according to the invention.

As shown schematically on FIG. 1 and designated by the general reference marked 10, a system according to one embodiment of the invention is provided on board an aircraft for checking/following the state of formation/accumulation of ice on the aircraft in real or quasi-real time.

More particularly, the system has as an object to check/follow the formation of ice on the aircraft during a flight thereof and is especially capable of estimating at different moments during the flight of the aircraft the quantity of ice formed on one or more zones thereof. In general it involves parts of the aircraft that are exposed to the relative wind and "angular" parts of the aircraft such as the leading edges of the wing group.

FIG. 1 shows various elements making up system 10 according to the invention. System 10 comprises one or more sensors 12 which are, for example, sensors for measurement of pressure (total pressure, static pressure) and which supply their measurements to an inertial reference and data system 14. System 14 which, for example, is implemented in the form of an on-board computer, supplies as data in particular the measured speed of the aircraft in relation to the air, marked TAS$_{CUR}$ (current speed at a given moment), and also the time between two consecutive measurement moments.

This system also collects data originating from various sensors: incidence, side-slip, temperature sensors.

System 14 supplies anemometric and inertial data to several other on-board computers which use such data for performing other functions (electric flight controls, automatic pilot, computers that display data . . . ).

It will be noted that in general the aircraft comprises several systems such as system 14, for the sake of redundancy.

System 10 also comprises one or more sensors 16 for measurement of a parameter marked LWC which makes it possible to characterize frost conditions encountered by an aircraft during flight.

This parameter is an acronym meaning "Liquid Water Content" in English terminology and corresponds to the quantity of water in liquid form (supercooled water) that is contained in the clouds traversed by the aircraft and which is likely to turn into ice on the latter when the temperature requirements are met.

The parameter LWC expresses a water weight per unit of volume.

An example of such sensors is, for instance, a model KLWC-5 sensor furnished by the company PARTICLE MEASURING SYSTEM, Inc.

System 10 also comprises a unit 18 which uses the data supplied by system 14 and the sensor or sensors 16 for estimating in real or quasi-real time a quantity of ice SWC forming on one or more zones (exposed surfaces) of the aircraft. The parameter SWC is homogeneous with a surface mass (g/m$^2$) and corresponds to an average level of ice deposited on the exposed surfaces.

If several sensors 16 are used, an average may be established or an algorithm may be used for excluding measured values that might prove to be unreliable.

Unit 18 also has as a function to compare the quantity of frost estimated in this way to a threshold value so as to be able to check and make sure that the frost state of the aircraft remains within acceptable flight conditions in relation to a predefined performance envelope.

Optionally, unit 18 also has as a function to calculate the time remaining to the aircraft before an excessively large amount of frost forms on one or more outside zones thereof (wings, stabilizers).

Unit 18 is, for example, a computer carried on board the aircraft.

This unit 18 also is provided with memory zones or storage zones for data so as to receive data supplied by outside equipment items such as system 14 and sensor or sensors 16 and also for storing the results of intermediate calculations (intermediate data) as well as the results of final calculations (data produced by the unit).

The functioning of unit 18 will be described more particularly with reference to FIG. 2 which illustrates an algorithm for functioning of a method according to an embodiment of the invention.

System 10 also comprises one or more deicing or anti-icing devices 20 known in themselves, carried on board the aircraft.

It may involve, for example, heating resistors installed inside the wing group of the aircraft at the leading edge of this wing group.

Other known techniques of course may be used for making up all or part of device or devices 20.

This device connected to unit 18 thus may be activated on command according to the result or results supplied by this unit.

System 10 also comprises an alarm system 22 which itself also may be activated according to the result or results supplied by unit 18.

This alarm system, for example, has as a function to warn the members of the crew inside the cockpit to inform them of the state of frost formation on the aircraft.

System 22, for example, activates various units on command and makes it possible, for example, to send a visual alarm message that is going to be displayed on a display screen 24, for example inside the cockpit and/or an auditory alarm message that is intended to be transmitted via a loudspeaker 26 placed in the cockpit.

Deicing device or devices 20 and alarm system 22 may be activated simultaneously and automatically according to information items supplied by unit 18.

Alternatively, only system 22 may be activated automatically for informing the cockpit crew about the state of frost formation on the aircraft and they themselves then make the decision to activate or not to activate deicing device or devices 20.

Figure 2:
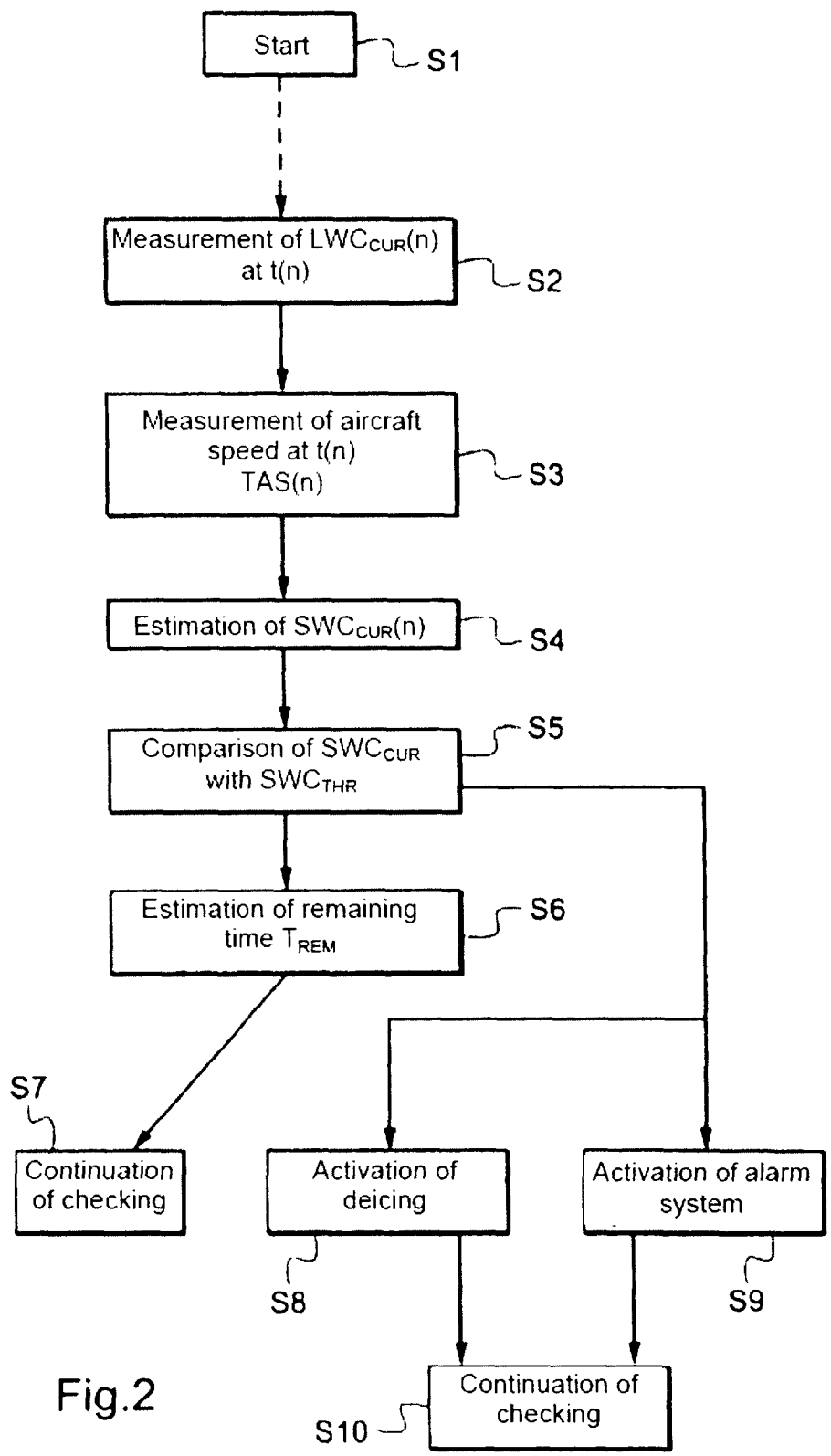
FIG. 2 is an algorithm for a method according to the invention which is implemented by the system of FIG. 1.

The algorithm of FIG. 2 illustrates in greater detail the functioning of system 10 according to one embodiment of the invention and comprises several steps which are carried out by different elements making up the system.

The algorithm comprises a first step S1 representing the start of implementation of the method according to the invention.

The starting moment corresponds, for example, to the moment when the deicing or anti-icing device or devices of the aircraft are activated automatically.

System 18 may set off this activation based on the knowledge of information items coming from sensors 16 and information items from system 14. These information items convey, for example, the moment when the aircraft enters an external environment where icing conditions prevail.

Activation also may be set off manually by the crew.

There now is going to be described the steps of the method corresponding to different measurement moments $t(n-1)$ and $t(n)$ during flight of the aircraft knowing that the method carries out a plurality of measurements and calculations according to a plurality of successive temporal moments during flight of the aircraft under freezing conditions.

The algorithm comprises a step S2 during which the sensor or sensors 16 measure, at moment $t(n)$, a value for a quantity of liquid water which is likely to turn into ice, this quantity being marked $LWC_{CUR}(n)$.

At this temporal moment there also is carried out during step S3 a measurement of the speed of the aircraft by virtue of sensor 12 and system 14 of FIG. 1, the speed being marked $TAS(n)$.

The algorithm then comprises a step S4 of estimation of the quantity of ice forming at least on one zone of the aircraft according to flight conditions encountered by the latter.

The quantity of ice marked $SWC_{CUR}(n)$ at moment $t(n)$ depends on several of the parameters obtained previously, namely the speed of the aircraft, the time between two measurement moments for this speed, the quantity of liquid water measured at moment $t(n)$ and the quantity of ice calculated at moment $t(n-1)$ and which is marked $SWC_{CUR}(n-1)$.

The quantity of ice estimated at moment $t(n)$ is given by the following formula:

$$SWC_{CUR}(n)=SWC_{CUR}(n-1)+LWC_{CUR}(n)*TAS(n)*[t(n)-t(n-1)],$$

where the expression $[t(n)-t(n-1)]$ represents the time between two consecutive moments at which the speed of the aircraft and the quantity of water in liquid form encountered by the aircraft are measured.

It will be noted that the value $LWC_{CUR}(n)$ is the value for the quantity of water in liquid form present in the clouds traversed by the aircraft and measured at moment $t(n)$.

Alternatively, the value $LWC_{CUR}(n)$ may correspond to the greatest value between the two measured values $LWC_{CUR}(n)$ and $LWC_{CUR}(n-1)$.

It should be noted that the parameter SWC is known in English terminology under the term "Supercooled Water Catch" and corresponds, in general, to the integration of the quantity of liquid water throughout the mission of the aircraft (quantity of ice per unit of surface of the aircraft). This parameter generally is written in the following manner:

$$SWC = \Sigma LWC_i \times d_i$$

where $d_i$ is the distance traveled by the aircraft during which the parameter LWC is equal to $LWC_i$.

Complementarily, concurrently with the calculation of $SWC_{CUR}(n)$, the calculation of total exposure time $T_{EXP}(n)$ since activation of the deicing systems defined such that $T_{EXP}(n)=T_{EXP}(n-1)+[t(n)-t(n-1)]$ is performed.

This makes it possible to calculate the average rate of ice accretion $\tau_{ACR}med$ defined by $\tau_{ACR}med=SWC_{CUR}(n)/T_{EXP}(n)$, that is to say a quantity of ice related to an exposure time.

The following step S5 of the algorithm of FIG. 2 provides for comparing the quantity of ice and/or the average rate of ice accretion estimated in the preceding step S4 with a predetermined quantity of ice and/or a rate of ice accretion respectively defining a threshold.

This threshold value marked $SWC_{THR}$ generally is lower than a maximal quantity of ice marked $SWC_{max}$ which has been obtained beforehand at the time of the process for certification of the aircraft in freezing conditions.

Alternatively, several thresholds may be used for the quantity of ice, for example three thresholds $SWC_{THR}1$, $SWC_{THR}2$ and $SWC_{THR}3$ corresponding to an onset of icing conditions, moderate icing conditions and severe icing conditions respectively.

In general and by way of example, the difference among these three thresholds is defined as follows:

$SWC_{THR}1 = 0.2*SWC_{THR}3$
$SWC_{THR}2 = 0.5*SWC_{THR}3$
$SWC_{THR}3 = SWC_{max} - SWC_{margin}$ with $SWC_{margin}$ a safety margin between $SWC_{max}$ and $SWC_{THR}3$ making it possible to apply operational procedures before threshold $SWC_{max}$ is reached. Likewise, one or more thresholds are used for the average rate of ice accretion. For example, three thresholds $\tau_{ACR}1$, $\tau_{ACR}2$ and $\tau_{ACR}3$ are used, for which a rate $\tau_{ACR}med$ lower than $\tau_{ACR}1$ corresponds to a slight icing, a rate ranging between $\tau_{ACR}1$ and $\tau_{ACR}2$ to a moderate icing and a rate higher than $\tau_{ACR}2$ to a severe icing. In this case $\tau_{ACR}3$ would correspond to a maximal rate playing the same role as $SWC_{max}$ for the quantity of ice.

The information items relating to the average rate of ice accretion and the estimated quantity of ice may be combined. For example, an alarm is set off when one or the other of the thresholds corresponding to the quantity of ice or to the rate of ice accretion respectively is exceeded. This alarm is set off in particular during step S9 described below.

At the time of the certification process the form of the ice deposits on different exterior surfaces of the aircraft is of interest and simulations also are carried out on the maximum deposits that it is possible to obtain on these surfaces. Flight testing also may be performed so as to verify the studies conducted on the ground (simulations, wind-tunnel tests . . . ).

These forms of deposits are determined/calculated by using an operational scenario drawn up on the basis of the mission of the aircraft.

Such a scenario is defined by a set of flight conditions which are characterized in particular by the following elements (non-exhaustively):
- temperature outside the aircraft (TAT)
- number, type and size of the clouds encountered by the aircraft,
- quantity of water in the clouds (characterized by the parameter LWC) and size of the water droplets (in particular diameter of the water droplets marked VMD),
- time of flight under freezing conditions,
- altitude, air speed and incidence (angle of attack), on the aircraft.

In this way, at the time of these tests the maximal quantity of ice $SWC_{max}$ is determined with the forms that the ice may assume when it is deposited on the surfaces of the aircraft.

During step S5 a comparison thus is carried out between the current value of the quantity of ice formed at moment t(n) on the aircraft and which is estimated in real or quasi-real time (taking into account the time-lag between the moment when the measurements are made and the moment when the calculations are carried out) and threshold value $SWC_{THR}$.

The threshold value is determined so as to provide the crew with a safety margin in relation to maximal threshold value $SWC_{max}$.

By virtue of this safety margin, actions may be undertaken by the crew or by systems carried on board the aircraft while ice continues to form on the aircraft without, however, reaching an excessively high value.

According to the result of the comparison, different actions may be implemented.

If the estimated $SWC_{CUR}$ value is below threshold value $SWC_{THR}$, then it is provided during a following step S6 to estimate the time remaining to the aircraft to fly under freezing conditions.

This time, marked $T_{REM}$, generally is written according to the following formula:

$$T_{REM}=(SWC_{THR}-SWC_{CUR})/(LWC_{CUR}*TAS_{CUR}),$$

where $SWC_{CUR}$, $LWC_{CUR}$ and TAS are values considered at moment t(n).

It will be noted that it is conceivable to filter the measured values (it generally involves filtering the high frequencies) so that the values used by the method according to the invention will be reliable and not disrupted by a measurement noise.

Knowing this time, the crew thus knows for how much more time ice may form on the surface of the aircraft before reaching the excessively high value $SWC_{max}$.

Step S6 then is followed by step S7 which provides for continuing the checking procedure of the method according to the invention and performing steps S2 to S6 again.

Reverting to step S5, when the estimated quantity $SWC_{CUR}$ is greater than or equal to intermediate threshold $SWC_{THR}$, the algorithm continues with step S6 already described and, concurrently, with steps S8 and S9.

Step S8 is a step during which the deicing device or devices present on board the aircraft are activated automatically or by order of the crew.

In the same way, step S9 provides for activating one or more alarm systems and, in particular, for transmitting one or more visual and/or auditory alarm messages as already described with reference to FIG. 1.

It also will be noted that the activation of the alarm system provided for in step S9 may be implemented prior to step S8 which itself may be activated on command by the crew once the latter has been informed of the current icing state of the aircraft.

The check provided by the method according to the invention then continues as illustrated with step S10.

According to an implementation variant, the parameter representative of the quantity of liquid water likely to turn into ice on the aircraft and which is marked LWC possibly is not measured on board the aircraft.

Under these conditions, the invention provides for using a constant value for this quantity of liquid water, marked $LWC_{AVE}$ and which has been determined, for example, at the time of the process for certification of the aircraft in freezing conditions.

The predetermined value of parameter LWC is the one that is used during the certification process for determination of the forms of ice based on a scenario.

In fact, an operational scenario is used for defining the "forms of ice" that make it possible to evaluate the aerodynamic consequences on the aircraft. This scenario is defined by the flight parameters (altitude, airplane speed, weight, centering) and the atmospheric conditions (LWC, size of the droplets, temperature).

It will be noted that the greater the $LWC_{AVE}$ value, the higher the rate of frost deposit on the aircraft.

The estimated quantity of ice $SWC_{CUR}$ thus varies only according to the distance traveled by the aircraft, and is determined by the following formula:

$$SWC_{CUR}(n)=SWC_{CUR}(n+1)+LWC_{AVE}*TAS(n)*[t(n)-t(n-1)],$$

where [t(n)−t(n−1)] represents the time between two consecutive measurements of the speed of the aircraft TAS.

It should be noted that parameter LWC is measured even in the absence of implementation of the method according to the invention.

The start of the calculation performed in steps S4 and following of FIG. 2 is, for example, dependent on a predetermined threshold of parameter LWC (low) or on the automatic or manual detection of freezing conditions.

Alternatively, there may be used a system such as system 18 that monitors freezing conditions or, on certain aircraft, an outside control (in the cockpit) that is going to ice up, such as windshield wipers, for example, may be used. In the latter cases, the crew may activate the deicing systems manually.

By way of example, the process for certification of an aircraft for flying in freezing conditions has made it possible to determine the following values for parameters $SWC_{MAX}$, $SWC_{THR}$, $SWC_{THR1}$, $SWC_{THR2}$, $SWC_{THR3}$, $\tau_{ACR1}$, $\tau_{ACR2}$, and $\tau_{ACR3}$:

$SWC_{MAX}=120$ kg/m$^2$
$SWC_{THR}=100$ kg/m$^2$
$SWC_{THR}1=20$ kg/m$^3$
$SWC_{THR}2=50$ kg/m$^3$
$SWC_{THR}3=100$ kg/m$^3$
$\tau_{ACR}1=0.8$ kg/m$^3$/min
$\tau_{ACR}2=1.7$ kg/m$^3$/min
$\tau_{ACR}3=3.4$ kg/m$^3$/min Current flight conditions are defined by the following data:
$CAS_{CUR}=250$ knots
Current altitude: $Z_{CUR}=10000$ feet $TAS_{CUR}$=288 knots, or 148.16 m/s At moment t, $SWC_{CUR}$ is equal to 70 kg/m²

There then may be calculated the remaining time ($T_{REM}$) under current conditions ($CAS_{CUR}$; $Z_{CUR}$) and taking into account the value $LWC_{CUR}$ according to two possible scenarios:

1) A sensor for measurement of parameter LWC supplies, for example, the following value:

$$LWC_{CUR}=0.16\ 10^{-3}\ kg/m^3$$

From which, in application of the formula given above:
$T_{REM}=(SWC_{THR}-SWC_{CUR})/(LWC_{CUR}*TAS_{CUR})=(100-70)/(0.16\ 10^{-3}*148.16)$ Or, $T_{REM}$=1266 s=21 nm 6 s The airplane therefore still may fly for 21 nm and 6 s under the current conditions before the alarm threshold is reached and an alarm is set off.

2) If there is no sensor for measurement of LWC on board the aircraft, there is used an overestimated value for LWC marked $LWC_{MAX}$, which value is assumed not to be exceeded in flight and which is, for example:

$$LWC_{MAX}=0.30\ 10^{-3}\ kg/m^3$$

from which, $T_{REM}=(SWC_{THR}-SWR_{CUR})/(LWC_{MAX}*TAS_{CUR})=(100-70)/(0.30\ 10^{-3}*148.16)$ Or, $T_{REM}$=675 s=11 nm 15 s The airplane therefore still may fly for 11 nm and 15 s under the current conditions before the alarm relating to the level of ice accretion is transmitted.

The total flight time in freezing conditions (before the alarm) at this attitude and at this speed therefore is given by the following formula:

$$T_{TOT}=SWC_{THR}/(LWC_{MAX}*TAS_{CUR})=100/(0.30)10^{-3}*148.16)$$

$T_{TOT}$=2250 s=37 nm 30 s

After the alarm, the aircraft will have a time $T_{ESL}$ to come out of the freezing conditions:
$T_{ESC}=(SWO_{MAX}-SWC_{THR})/(LWC_{MAX}*TAS_{CUR})=(120-100)/(0.30\ 10^{-3}*148.6)$ Or, $T_{ESL}$=7 nm 30 s

The invention claimed is:

1. A method for checking ice formation on an aircraft in flight, the method comprising:
  estimating in real time a quantity of ice forming on at least one zone of the aircraft based on flight conditions; and
  comparing the estimated quantity of ice to a plurality of predetermined quantities of ice thresholds,
  wherein the plurality of predetermined quantities of ice thresholds respectively correspond to distinct flight phases of the aircraft.

2. The method according to claim 1, wherein the estimation in real time of the quantity of ice is based on a distance traveled by the aircraft and on a quantity of liquid water available to turn into ice on the aircraft.

3. The method according to claim 1, wherein the estimation in real time of the quantity of ice uses an average rate of ice accretion corresponding to the estimated quantity of ice, and the comparison of the estimated quantity of ice to the plurality of predetermined quantities of ice thresholds is performed based on the estimated rate of ice accretion and at least one predetermined rate of ice accretion.

4. The method according to claim 1, further comprising estimating an amount of time remaining for the aircraft to fly under freezing conditions until reaching a predetermined quantity of ice.

5. The method according to claim 1, wherein one of the predetermined quantities of ice thresholds is less than a maximal quantity of ice set at a time of a process for certification of the aircraft in freezing conditions.

6. The method according to claim 1, comprising, based on a result of the comparison, activating at least one of a deicing device on board the aircraft and an alarm system that transmits at least one of a visual and an auditory alarm message.

7. The method according to claim 1, further comprising estimating a time remaining until the estimated quantity of ice reaches one or more of the predetermined quantities of ice thresholds.

8. The method according to claim 1, further comprising estimating a time remaining until the estimated quantity of ice reaches a predetermined quantity of ice, the predetermined quantity of ice being a maximal quantity of ice set according to an aircraft certification process of the aircraft for flying in freezing conditions.

9. The method according to claim 1,
  wherein the plurality of predetermined quantities of ice thresholds include first, second, and third quantities of ice thresholds, and
  the method further comprising activating an alarm based on a result of the comparison indicating the estimated quantity of ice has reached any of the first threshold, the second threshold, and the third threshold,
  wherein the first threshold represents an onset of freezing conditions and the third threshold represents a maximal quantity of ice set according to an aircraft certification process of the aircraft for freezing conditions.

10. The method according to claim 1, wherein the estimation in real time of the quantity of ice includes:
  obtaining a speed of the aircraft, and
  obtaining a value for a quantity of liquid water available to turn into ice on the aircraft.

11. The method according to claim 10, wherein the obtaining the value for the quantity of liquid water includes measurement of a quantity of liquid water encountered by the aircraft during flight.

12. The method according to claim 10, wherein the value for the quantity of water obtained is a predetermined value determined prior to the flight.

13. A system to check ice formation on an aircraft in flight, the system comprising:
  a processor including:
  an ice quantity estimation unit to estimate in real time a quantity of ice forming on at least one zone of the aircraft to based on flight conditions; and
  a comparing unit to compare the estimated quantity of ice to a plurality of predetermined quantities of ice thresholds,
  wherein the plurality of predetermined quantities of ice thresholds respectively correspond to distinct flight phases of the aircraft.

14. An aircraft comprising the system according to claim 13.

15. The system according to claim 13, wherein the processor further includes an alarm generation unit to generate an alarm for a manual deicing operation based on an output of the comparing unit indicating that the estimated quantity of ice meets or exceeds one of the predetermined quantities of ice thresholds.

16. The system according to claim 13, wherein the processor further includes an automatic deicing unit that is activated to deice the at least one zone of the aircraft responsive to an output of the comparing unit indicating the estimated quantity of ice meets or exceeds one of the predetermined quantities of ice thresholds below a maximal quantity of ice.

17. The system according to claim 13, wherein the processor further includes a time estimating unit to estimate an amount of time remaining until the estimated quantity of ice reaches one or more of the predetermined quantities of ice thresholds.

* * * * *